May 26, 1970  G. L. EMMONS  3,513,928

COMBINED VEHICLE AND EXERCISING DEVICE

Filed Sept. 25, 1968

INVENTOR
GLENN L. EMMONS

BY
Kenwon, Palmer & Estabrook

ATTORNEYS

United States Patent Office 3,513,928
Patented May 26, 1970

3,513,928
COMBINED VEHICLE AND EXERCISING DEVICE
Glenn L. Emmons, 1512 Los Alamos SW.,
Albuquerque, N. Mex. 87104
Filed Sept. 25, 1968, Ser. No. 762,430
Int. Cl. B60k 1/00, 33/00
U.S. Cl. 180—65                                    5 Claims

ABSTRACT OF THE DISCLOSURE

A motor driven vehicle is disclosed which includes an exercising device operatively connected with and controlling the speed control of the vehicle.

BACKGROUND OF THE INVENTION

Motorized carts for use on golf courses have come into widespread use and particularly in areas where caddies are scarce. Even in areas where caddies are available, the motorized carts have become popular for golfers of advanced years or those suffering from some physical disability which would preclude or seriously detract from their enjoyment of playing the game if they were required to walk. For a great many golfers, however, insufficient exercise is involved in playing a round of golf when using a motorized cart. Accordingly, it is an object of the present invention to provide in combination with a motorized cart, an adjustable exercising device so that the operator of the cart may take as little or as much exercise as he wishes during the time that he is driving the cart.

BRIEF SUMMARY OF THE INVENTION

In general, the objects of the present invention are achieved by providing on a motorized cart an adjustable effort exercising device in the form of a pedal driven pump, the inlet and outlet of which are connected in a closed fluid circuit. An adjustable valve or valves connected in the fluid circuit permits adjustable loading to predetermine the effort required to turn the pump. Also connected in the closed fluid circuit is a piston and cylinder arrangement connected to the speed control for the cart so that the speed of the vehicle is varied in accordance with the speed of operation of the exercise device.

DETAILED DESCRIPTION OF THE DRAWINGS

Figure 1:
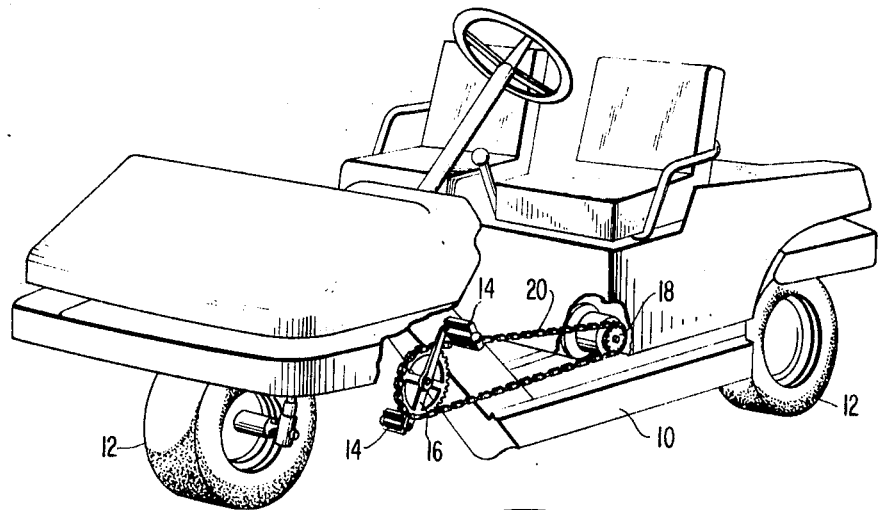
FIG. 1 is a perspective view of a motorized cart in accordance with the present invention having an exercising device mounted thereon.

Referring first to FIG. 1, it will be noted that the cart includes a frame 10 and ground-engaging wheels 12 which are entirely conventional in the art. Mounted in a position to be operated by the driver of the cart is a pair of foot pedals 14 for rotating a sprocket 16. A fluid pump 18 is also mounted on the vehicle and arranged to be driven by the pedals 14 by means of a conventional sprocket chain 20.

Figure 2:
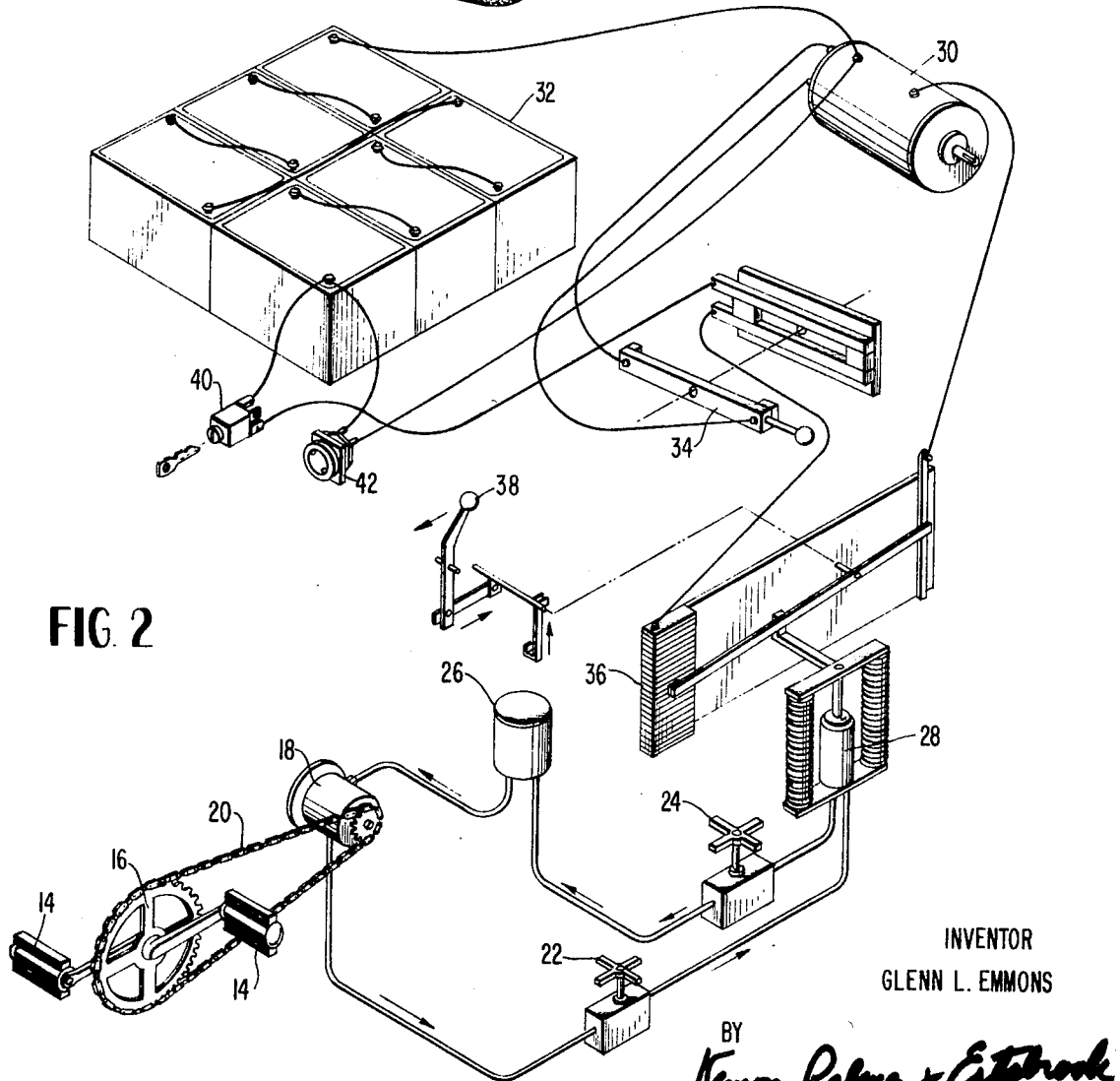
FIG. 2 is a schematic diagram of the hydraulic and electrical circuitry of the vehicle.

Referring now to FIG. 2 for a description of the combined electrical and hydraulic systems of the vehicle, it will be seen that the inlet and outlet of the pump 18 are connected in a closed fluid circuit which includes adjustable needle valves 22 and 24, a fluid reservoir 26, and a single acting cylinder 28.

The drive motor for the vehicle is indicated at 30 and the batteries which supply the driving energy to the motor 30 are shown at 32. As is usual in vehicles of this type, a reversing switch 34 is connected in circuit with the motor and the batteries as well as a speed control resistor 36. In a conventional cart, the setting of the speed control resistor 36 is under the manual control of the operator through a lever such as indicated at 38. Also, as is conventional in vehicles of this type, an on-off switch 40 is provided as well as a receptacle 42 which permits connection of the vehicle to a recharging means.

In accordance with the present invention, the speed control resistor 36 is also connected to be operated by the single acting cylinder 28 which forms a part of the closed fluid circuit of the pump 18.

OPERATION

The operator of the cart may predetermine the amount of exercise that he wishes to have by setting the needle valves 22 and 24 which change the loading on the pump 18 and therefore the effort necessary to rotate the pump. Operation of the pedals 14 therefore not only provides exercise for the driver, but the speed of operation will affect the setting of the variable resistor 36, the relationship being such that the faster the pedals are turned, the faster the vehicle will travel. Obviously, the vehicle may also be operated without reference to the exercising device and the speed thereof controlled in the conventional way by means of the speed-setting lever 38.

I claim:
1. A combined vehicle and exercising device comprising:
(a) a frame having ground-engaging wheels thereon and motor driven variable speed driving means for positively propelling said vehicle;
(b) an exercising device mounted on said vehicle;
(c) and means interconnecting said exercising device and said variable speed driving means for varying the speed of said driving means in proportion to the speed of operation of said exercising device.

2. The combination defined by claim 1 in which said driving means comprises an electric motor.

3. The combination defined by claim 2 in which said exercising device comprises a pair of foot pedals; a pump connected to be driven by said pedals; and a closed fluid circuit connected between the inlet and the outlet of said pump.

4. The combination defined by claim 3 in which said closed fluid circuit includes an adjustable loading means to predetermine the effort necessary to rotate said pump.

5. The combination defined by claim 3 including a rheostat connected in circuit with said motor for varying the speed thereof and in which said closed fluid circuit includes a single acting cylinder connected to said rheostat.

References Cited

UNITED STATES PATENTS

| 627,066 | 6/1899 | Schnepf | 180—34 |
| 2,277,391 | 3/1942 | Crumble | 280—215 |
| 3,424,260 | 1/1969 | Stone et al. | 180—66 |

BENJAMIN HERSH, Primary Examiner
R. R. SONG, Assistant Examiner

U.S. Cl. X.R.
180—1, 34, 77; 272—73